United States Patent
Lin et al.

(10) Patent No.: US 12,158,790 B2
(45) Date of Patent: Dec. 3, 2024

(54) ELECTRONIC WAKE-UP DEVICE AND WAKE-UP METHOD THEREOF

(71) Applicant: Silicon Integrated Systems Corp., Hsinchu (TW)

(72) Inventors: Wen-Chi Lin, Hsinchu (TW); Keng-Nan Chen, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 44 days.

(21) Appl. No.: 18/200,602

(22) Filed: May 23, 2023

(65) Prior Publication Data

US 2023/0376102 A1 Nov. 23, 2023

(30) Foreign Application Priority Data

May 23, 2022 (TW) ................................. 111119117

(51) Int. Cl.
*G06F 1/26* (2006.01)
*G06F 1/32* (2019.01)
*G06F 1/3231* (2019.01)
*G06F 1/3296* (2019.01)

(52) U.S. Cl.
CPC .......... *G06F 1/3231* (2013.01); *G06F 1/3296* (2013.01)

(58) Field of Classification Search
CPC .... G06F 1/3231; G06F 1/3296; G06F 1/1694; G06F 9/4418; G06F 1/3206
See application file for complete search history.

(56) References Cited

U.S. PATENT DOCUMENTS

| | | | |
|---|---|---|---|
| 8,200,997 B2 * | 6/2012 | Chen ...................... | G06F 1/3215 713/323 |
| 2012/0161521 A1 * | 6/2012 | Hung .................. | H04N 21/4436 307/64 |
| 2015/0339481 A1 | 11/2015 | Lin | |
| 2020/0052922 A1 * | 2/2020 | Lee ..................... | H04L 12/2823 |

FOREIGN PATENT DOCUMENTS

| | | |
|---|---|---|
| CN | 114451863 | 5/2022 |
| TW | 201502872 | 1/2015 |
| TW | 201727484 | 8/2017 |

* cited by examiner

*Primary Examiner* — Xuxing Chen

(57) ABSTRACT

An electronic wake-up device and a wake-up method thereof are provided. The electronic wake-up device includes: a power switch device, an electronic device, a gravity sensor, and a wake-up circuit. The wake-up circuit is coupled to the gravity sensor and the electronic device. The wake-up circuit is configured to generate an execution signal according to a sensing activation signal, and generate an electronic device control signal according to the execution signal and a gravity signal to wake up the electronic device.

10 Claims, 4 Drawing Sheets

ELECTRONIC WAKE-UP DEVICE AND WAKE-UP METHOD THEREOF

FIELD OF INVENTION

The present application relates to an electronic wake-up device and a wake-up method thereof, in particular to an electronic wake-up device and a wake-up method thereof which makes gravity sensors with different initial conditions compatible with electronic devices.

BACKGROUND OF INVENTION

Currently, in order to save power consumption, mobile electronic devices are configured to enter into a sleep mode after being stationary for a period of time. A gravity sensor (G-sensor) is a commonly used wake-up element, which is used to sense whether an electronic device is moved, and output an interrupt signal to wake up the electronic device.

However, initial values of an operation of the gravity sensor of different brands are different, some activated when the initial value is 0, and some activated when the initial value is 1, resulting in limited selection of materials of the gravity sensor.

Therefore, how to provide an electronic wake-up device so that the gravity sensors with different activation conditions can be compatible with the electronic device is an urgent issue for those skilled in the art to study.

SUMMARY OF INVENTION

A purpose of the present application is to properly solve the above-mentioned problems in the prior art without greatly increasing design complexity or production cost.

Based on the above object, the present application provides an electronic wake-up device connected to an electronic device, including:
- a power switch device configured to generate a power switch signal according to an input operation;
- an electronic device coupled to the power switch device, wherein the electronic device is configured to receive the power switch signal to be activated and generate a setting signal and a sensing activation signal;
- a gravity sensor coupled to the electronic device, wherein the gravity sensor is configured to receive the setting signal to enter an initial activation state, and wherein the gravity sensor generates a gravity signal according to a gravity change of the electronic device; and
- a wake-up circuit coupled to the electronic device and the gravity sensor, wherein the wake-up circuit is configured to receive the sensing activation signal and generate an execution signal according to the sensing activation signal, and generate an electronic device control signal according to the execution signal and the gravity signal to wake up the electronic device.

Optionally, in one embodiment of the present application, the wake-up circuit includes:
- a flip-flop, wherein a first input terminal of the flip-flop is connected to a power supply high electrical potential, wherein a second input terminal of the flip-flop is connected to the electronic device, and wherein the flip-flop is configured to output the execution signal according to the sensing activation signal; and
- a data multiplexer coupled to the flip-flop, wherein the data multiplexer is configured to receive the execution signal to enter an operating state, wherein a first input terminal of the data multiplexer is connected to a ground electrical potential, wherein a second input terminal of the data multiplexer is coupled to the gravity sensor, and wherein the data multiplexer generates the electronic device control signal according to the gravity signal to wake up the electronic device when the data multiplexer is in the operating state.

Optionally, in one embodiment of the present application, a power supply high electrical potential of the electronic device has a same electrical potential as the power supply high electrical potential connected to the first input terminal of the flip-flop.

Optionally, in one embodiment of the present application, the power switch device is coupled to the electronic device, wherein the power switch signal includes a power on signal and a power off signal, and wherein the sensing activation signal is at a low electrical potential when the electronic device receives the power off signal.

Optionally, in an embodiment of the present application, the gravity signal is at a low electrical potential when the gravity sensor is in the initial activation state.

Optionally, in an embodiment of the present application, the wake-up circuit wakes up the electronic device when the electronic device control signal is at a low electrical potential.

Optionally, in an embodiment of the present application, the gravity sensor is connected to the electronic device through an interface module, and wherein the interface module includes an integrated circuit bus.

Optionally, in an embodiment of the present application, the gravity sensor is connected to the electronic device through an interface module, and wherein the interface module includes a serial peripheral interface.

The present application also provides a method of waking up an electronic device, including:
- using a power switch device to generate a power switch signal according to an input operation;
- using an electronic device to receive the power switch signal to be activated, and generating a setting signal and a sensing activation signal;
- using a gravity sensor to receive the setting signal to enter an initial activation state, and generating a gravity signal according to a gravity change of the electronic device; and
- using a wake-up circuit to generate an electronic device control signal to wake up the electronic device according to the gravity signal and the sensing activation signal, including:
  - using a flip-flop to output an execution signal according to the sensing activation signal;
  - using a data multiplexer to receive the execution signal to enter an operating state; and
  - using the data multiplexer to generate the electronic device control signal to wake up the electronic device according to the gravity signal when the data multiplexer is in the operating state.

Optionally, in one embodiment of the present application, the power switch device is coupled to the electronic device, wherein the power switch signal includes a power on signal and a power off signal, and wherein the sensing activation signal is at a low electrical potential when the electronic device receives the power off signal.

The present application has the following beneficial effects: The various embodiments of the present application can make gravity sensors with different activation conditions compatible with electronic devices, avoiding limited selection of materials of the gravity sensors suitable for electronic wake-up devices. In addition, a power supply high electrical potential of the electronic device and a power supply high electrical potential connected to the first input terminal of the flip-flop are designed to be equipotential, so as to ensure a stability of the driving current flowing through the electronic wake-up device and improve an amplitude of a current driving the electronic wake-up device. Furthermore, the present application uses a circuit design for coupling the power switch device and the electronic device, so that the user can simultaneously choose to switch the electronic wake-up device and the electronic device through the gravity change and the input operation of the power switch device. Moreover, the gravity sensor can be connected to the electronic device through an inter-integrated circuit (I2C) bus with a simple structure and a small occupation space, thereby reducing a space occupied by the circuit and the number of transistors between the gravity sensor and the electronic device. In addition, the gravity sensor can also be connected to the electronic device through a serial peripheral interface (SPI) bus with high data transmission rate, so as to improve a response speed of the gravity sensor to the setting signal, and to accurately sense a gravity change of the electronic device to improve an operational efficiency.

The following detailed descriptions are provided in conjunction with the accompanying figures through specific embodiments, so that it is easier to understand the purpose, technical content, characteristics and effects of the present application.

DETAILED DESCRIPTION OF EMBODIMENTS

Figure 1:
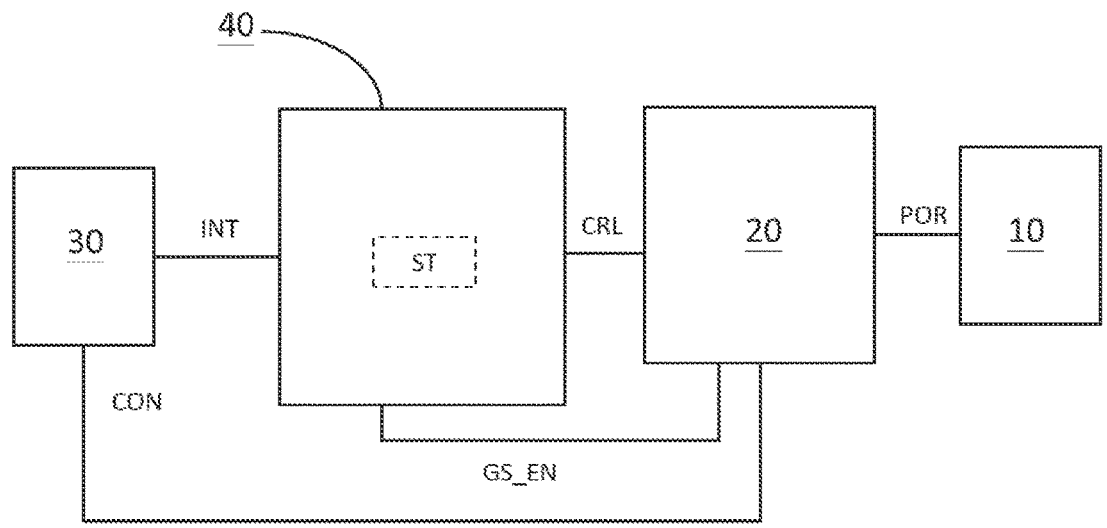
FIG. 1 is a schematic block diagram of one embodiment of an electronic wake-up device of the present application.

The present application is particularly described with the following examples, and these examples are only used for illustration, because for those skilled in the art, various changes and modifications can be made without departing from the spirit and scope of the present application. Therefore, a scope of protection of the content of the present application shall prevail as defined by the appended claims. Throughout the specification and claims, unless the content clearly dictates otherwise, the meaning of "a" and "the" includes such statements including "one" or "at least one" of that element or component. Furthermore, as used in the present application, unless it is obvious from the specific context that the plural is excluded, the singular article also includes a description of plural components or ingredients. Also, as applied to all claims in this description and below, the meaning of "in" may include "in" and "on" unless the content clearly dictates otherwise. The terms used throughout the specification and claims, unless otherwise specified, generally have the ordinary meaning of each term used in this field, in the content of the present application and in the specific content. Certain terms used to describe the present application are discussed below or elsewhere in this specification to provide the practitioner with additional guidance in describing the present application. The use of examples anywhere throughout the specification, including examples of any terms discussed herein, is by way of illustration only and certainly does not limit the scope and meaning of the present application or of any exemplified term. Likewise, the present application is not limited to the various embodiments presented in this specification.

It will be appreciated that the terms "comprising", "including", "having", "containing", "involving", etc. as used herein, are open-ended, which means including but not limited to. In addition, any embodiment or claim of the present application does not need to achieve all the objectives or advantages or features disclosed in the present application. In addition, the abstract and title are only used to assist in patent search and are not used to limit the claimed terms of the invention.

The technical solutions in the embodiments of the present application will be clearly and completely described below in conjunction with the accompanying figures in the embodiments of the present application. Obviously, the described embodiments are only a part of the embodiments of the present application, rather than all implementations example. Based on the embodiments of the present application, all other embodiments obtained by those skilled in the art without inventive steps fall within a protection scope of the present application. In addition, it should be understood that the specific embodiments described here are only used to illustrate and explain the present application, and are not intended to limit the present application. In the present application, unless stated to the contrary, the used orientation words such as "up" and "down" usually refer to up and down in the actual use or operating state of the device, specifically the direction of the drawing in the figures, while "inside" and "outside" refer to an outline of the device.

Please refer to the drawings in the accompanying figures, wherein the same component symbols represent the same components. The following description is based on illustrated specific embodiments of the present application, which should not be construed as limiting other specific embodiments of the present application not described in detail herein.

Please refer to FIG. 1, wherein FIG. 1 is a schematic block diagram of one embodiment of an electronic wake-up device of the present application. The present application provides an electronic wake-up device, including: a power switch device 10 configured to generate a power switch signal POR according to an input operation, an electronic device 20 coupled to the power switch device 10, wherein the electronic device receives the power switch signal POR to be activated and generate a setting signal CON and a sensing activation signal GS_EN, a gravity sensor 30 coupled to the electronic device 20, wherein the gravity sensor 30 is configured to receive the setting signal CON to enter an initial activation state, and wherein the gravity sensor 30 generates a gravity signal INT according to a gravity change of the electronic device 20, and a wake-up circuit 40 coupled to the electronic device 20 and the gravity sensor 30. The wake-up circuit 40 is configured to receive the sensing activation signal GS_EN, generate an execution signal ST according to the sensing activation signal GS_EN, and generate an electronic device control signal CRL according to the execution signal ST and the gravity signal INT to waking up the electronic device 20. The electronic wake-up device is configured to continuously detect whether the electronic device 20 needs to enter a sleep state after being activated, for example, when the electronic device 20 is idle for a preset time or the electronic device 20 enters the sleep state after receiving a sleep signal. A difference between the sleep state and an off state is that the sensing activation signal GS_EN is at a low electrical potential when the electronic device 20 is in the off state, the sensing activation signal GS_EN is at a high electrical potential when the electronic device 20 enters the sleep state. By the above-mentioned features, the present application can achieve the technical effect of waking up the electronic device 20 by means of the wake-up circuit 40 generating the electronic device control signal CRL according to the gravity signal INT when the electronic device 20 enters the sleep state without being turned off by the power switch signal POR again.

Figure 2:
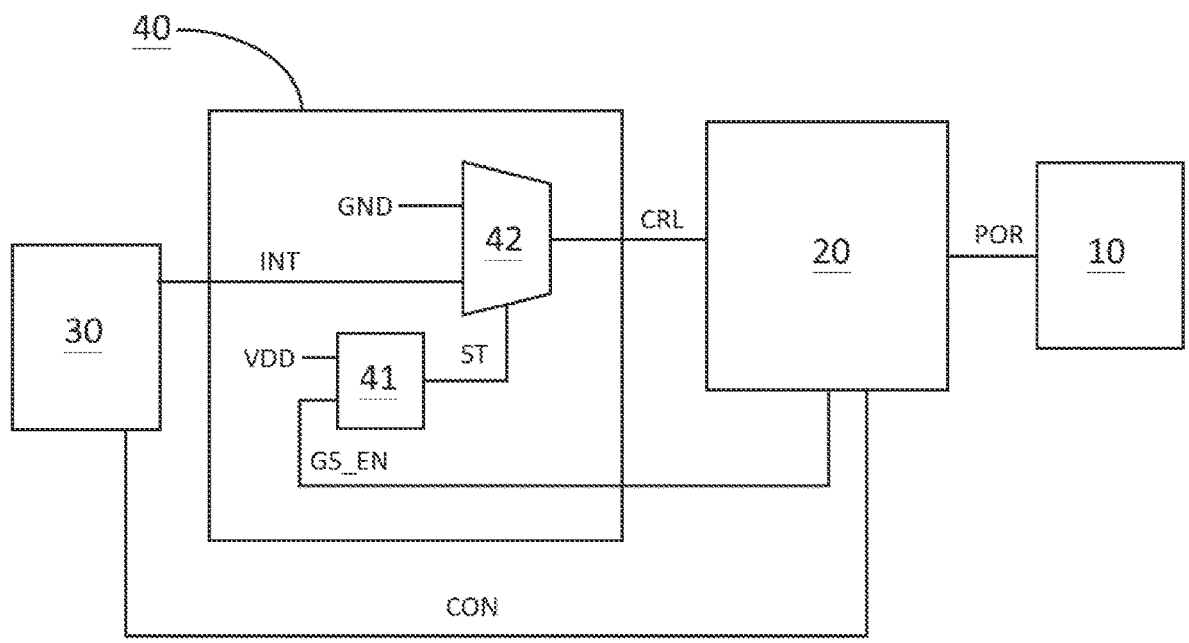
FIG. 2 is a schematic block diagram of one embodiment of the electronic wake-up device of the present application.
Figure 4:
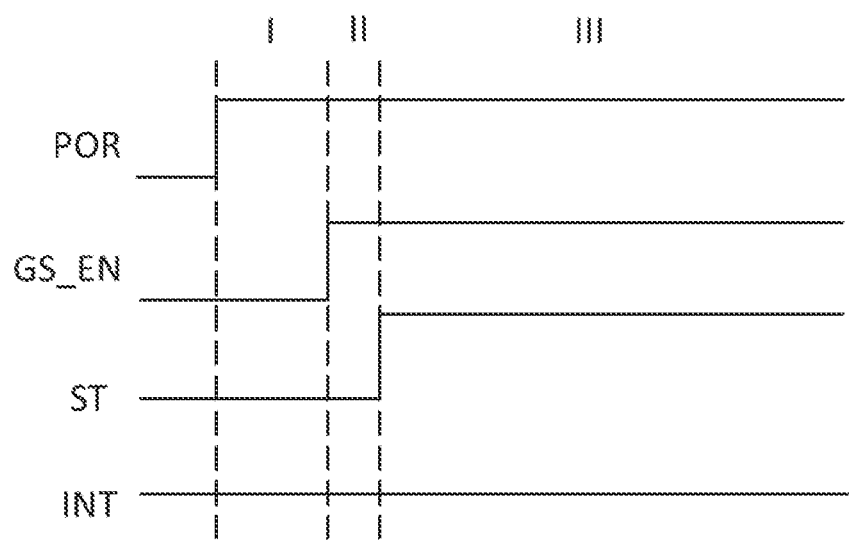
FIG. 4 is a schematic diagram of an operation sequence of the electronic wake-up device of the present application.

In one embodiment of the present application, please refer to FIGS. 2 and 4 together, wherein FIG. 2 is a schematic block diagram of one embodiment of the electronic wake-up device of the present application, and FIG. 4 is a schematic diagram of an operation sequence of the electronic wake-up device of the present application. The wake-up circuit 40 shown in FIG. 2 includes: a flip-flop 41, wherein a first input terminal of the flip-flop 41 is connected to a power supply high electrical potential VDD, wherein a second input terminal of the flip-flop 41 is connected to the electronic device 20 to receive the sensing activation signal GS_EN. The flip-flop 41 outputs an execution signal ST when the sensing activation signal GS_EN is at the high electrical potential. A data multiplexer 42 is coupled to the flip-flop 41. The data multiplexer 42 receives the execution signal ST to enter an operating state, wherein a first input terminal of the data multiplexer 42 is connected to a ground electrical potential GND, and a second input terminal of the data multiplexer 42 is connected to the gravity sensor 30. The data multiplexer 42 generates the electronic device control signal CRL to wake up the electronic device 20 when the data multiplexer 42 is in the operating state and the gravity signal INT is at a low electrical potential. The flip-flop 41 can be a D flip-flop or other flip-flops that can achieve the above-mentioned signal conversion. The data multiplexer 42 can be a two-to-one data multiplexer or other data multiplexers that can achieve the above-mentioned signal conversion.

In detail, the electronic wake-up device enters a first execution stage I when the power switch signal POR outputs a high electrical potential, the electronic wake-up device enters a second execution stage II when the power switch signal POR outputs a high electrical potential and the sensing activation signal GS_EN outputs the high electrical potential, the electronic wake-up device enters a third execution stage III when the data multiplexer 42 receives the execution signal ST and enters the operating state. The data multiplexer 42 in an operating state when the flip-flop 41 outputs the execution signal ST with the high electrical potential according to the sensing activation signal GS_EN, to control the electronic wake-up device from the second execution stage II to the third execution stage III. At this time, the gravity signal INT starts to affect an output of the wake-up circuit 40, so that the wake-up circuit 40 outputs the control signal CRL according to the signal change of the gravity signal INT. In the third execution stage III, the first input terminal of the data multiplexer 42 is connected to the ground electrical potential GND, therefore, the data multiplexer 42 outputs the device control signal CRL with a high electrical potential when the data multiplexer 42 receives the gravity signal INT with the high electrical potential, and the data multiplexer 42 outputs the device control signal CRL with a low electrical potential when the data multiplexer 42 receives the gravity signal INT with a low electrical potential. The electronic device control signal CRL with the low electrical potential is configured to wake up the electronic device 20, the electronic device control signal CRL with a high electrical potential is configured to make the electronic device 20 enter a sleep state. That is, in the first execution stage I and the second execution stage II of the electronic wake-up device, an electrical potential of the gravity signal INT does not affect an electrical potential of the electronic device control signal CRL output by the electronic wake-up device.

Through the above configuration, since the data multiplexer 42 which outputting the electronic device control signal CRL is operated after the flip-flop 41 sensing the sensing activation signal GS_EN, the signal change of the gravity signal INT is used to wake-up the electronic device 20 after the device 20 outputs the sensing activation signal GS_EN and the electronic wake-up device enters the third execution stage III. Furthermore, before the electronic device 20 activates the gravity sensor 30, an initial gravity signal of the gravity sensor of each brand may be 1, 0 or other values. Therefore, the electronic device 20 of the present application first outputs the setting signal CON to the gravity sensor 30 to activate the gravity sensor 30, and make the gravity sensor 30 output the gravity signal according to the change in gravity signal INT only after the gravity sensor 30 is in the initial activation state, so as to avoid the limitation of material selection of the gravity sensor 30 applicable to the electronic wake-up device.

In different embodiments of the present application, the electronic device 20 can be a mobile device such as a smart phone, a stylus, a tablet computer, a notebook computer, and a smart watch.

It should be noted that when the power switch device 10 has a button device, the input operation can be a single press operation or a combination of press operations with different frequency changes to output the power switch signal POR, or the power switch device 10 can be a wireless communication device including interfaces of different communication protocols, so as to facilitate users to output wireless signals to the power switch device 10 to output the power switch signal POR.

In one embodiment of the present application, the power supply high electrical potential of the electronic device 20 and the power supply high electrical potential VDD connected to the first input terminal of the flip-flop 41 are equipotential, so as to ensure that the driving current flowing through the electronic wake-up device stability, and increase the current amplitude driving the electronic wake-up device. In another embodiment of the present application, a ground electrical potential of the electronic device 20 is at the same electrical potential as the ground electrical potential GND connected to the first input terminal of the data multiplexer 42, so as to ensure a safety of the electronic wake-up device when the electronic device 20 is connected, and reduce a risk of damage to electronic wake-up device.

The power switch signal POR includes a power on signal and a power off signal. For example, the power switch signal POR is a power off signal when the power switch signal POR is at a low electrical potential, the power switch signal POR is a power on signal when the power switch signal POR is at a high electrical potential. The power switch signal POR is at the high electrical potential when the power switch device 10 receives the input operation to turn on the electronic wake-up device. The power switch signal POR is at the low electrical potential when the power switch device 10 receives the input operation to turn off the electronic wake-up device. An input operation for turning on and turning off the electronic wake-up device can be defined by the time of pressing the operation interface of the power switch device 10, a difference of a command input to the power switch device 10, or a difference of a way of transmitting the command input to the power switch device 10.

Figure 3:
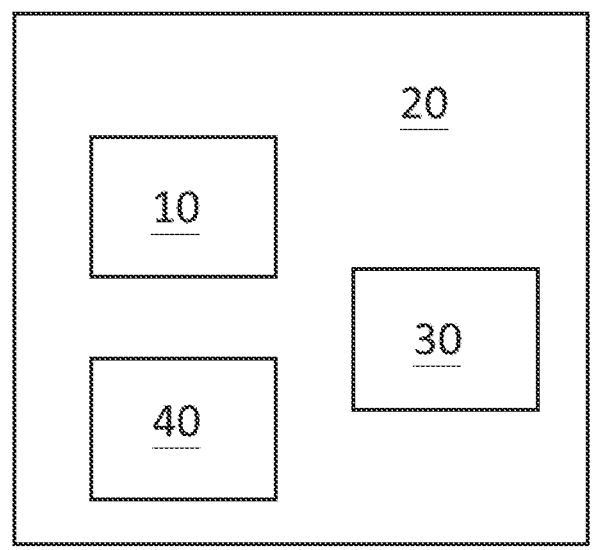
FIG. 3 is a schematic block diagram of one embodiment of the electronic wake-up device of the present application.

Please further refer to FIG. 3, which is a schematic block diagram of another embodiment of the electronic wake-up device of the present application. A difference between the embodiment provided in FIG. 3 and FIG. 2 is that the power switch device 10, the gravity sensor 30, and the wake-up circuit 40 can be installed inside the electronic device 20 to improve a consistency of a change of the gravity signal INT and the displacement change of the electronic device 20, thereby easy to carry and sense the movement of the electronic device 20, and reducing a configuration of circuit elements therebetween.

In one embodiment of the present application, the electronic wake-up device is configured to synchronously shut down with the electronic device 20 when the power switch device 10 outputs a power-off signal and the sensing activation signal GS_EN at the low electrical potential. Thereby, the execution signal ST is at the low electrical potential, so the data multiplexer 42 will not be in the operating state. In addition, the sensing activation signal GS_EN of the wake-up circuit is configured to be at the low electrical potential when the power switch device 10 outputs the power-on signal to activate the electronic device 20. At this time, the execution signal ST is still at the low electrical potential, so that the data multiplexer 42 will not be in the operating state. Therefore, the electronic wake-up device of the present application will not affect the start-up process of the power switch device 10 to start the electronic device 20 due to the gravity signal INT, so that the electronic device 20 will be started normally and will not be mistakenly entered to the sleep mode.

In one embodiment of the present application, the gravity sensor 30 is configured to connect to the electronic device 20 through an interface module including an inter-integrated circuit (I2C). The gravity sensor 30 is connected to the electronic device 20 by a simple and space-saving integrated circuit bus to reduce the circuit space and the number of transistors used between the gravity sensor 30 and the electronic device 20.

In one embodiment of the present application, the gravity sensor 30 is configured to be connected to the electronic device 20 through an interface module including a serial peripheral interface (SPI) bus, to increase a response speed of the gravity sensor 30 in response to the setting signal CON, and to accurately sense the gravity change of the electronic device 20 to improve the operating efficiency.

In addition, the electronic device 20 enters the sleep state when the electronic device 30 detects that it has not been used for a period of time, and outputs a sleep signal through the integrated circuit bus I2C or the serial peripheral interface SPI to the gravity sensor 30. The gravity sensor 30 sets the gravity signal INT to 1 after receiving the sleep signal. The gravity signal INT output by the gravity sensor 30 is 0 to wake up the electronic device 20 when there is a gravity change, so that after the electronic wake-up device is activated, the electronic wake-up device can continuously detect whether it needs to sleep, and continuously detect whether the gravity change requires to wake up the electronic device 20.

Figure 5:
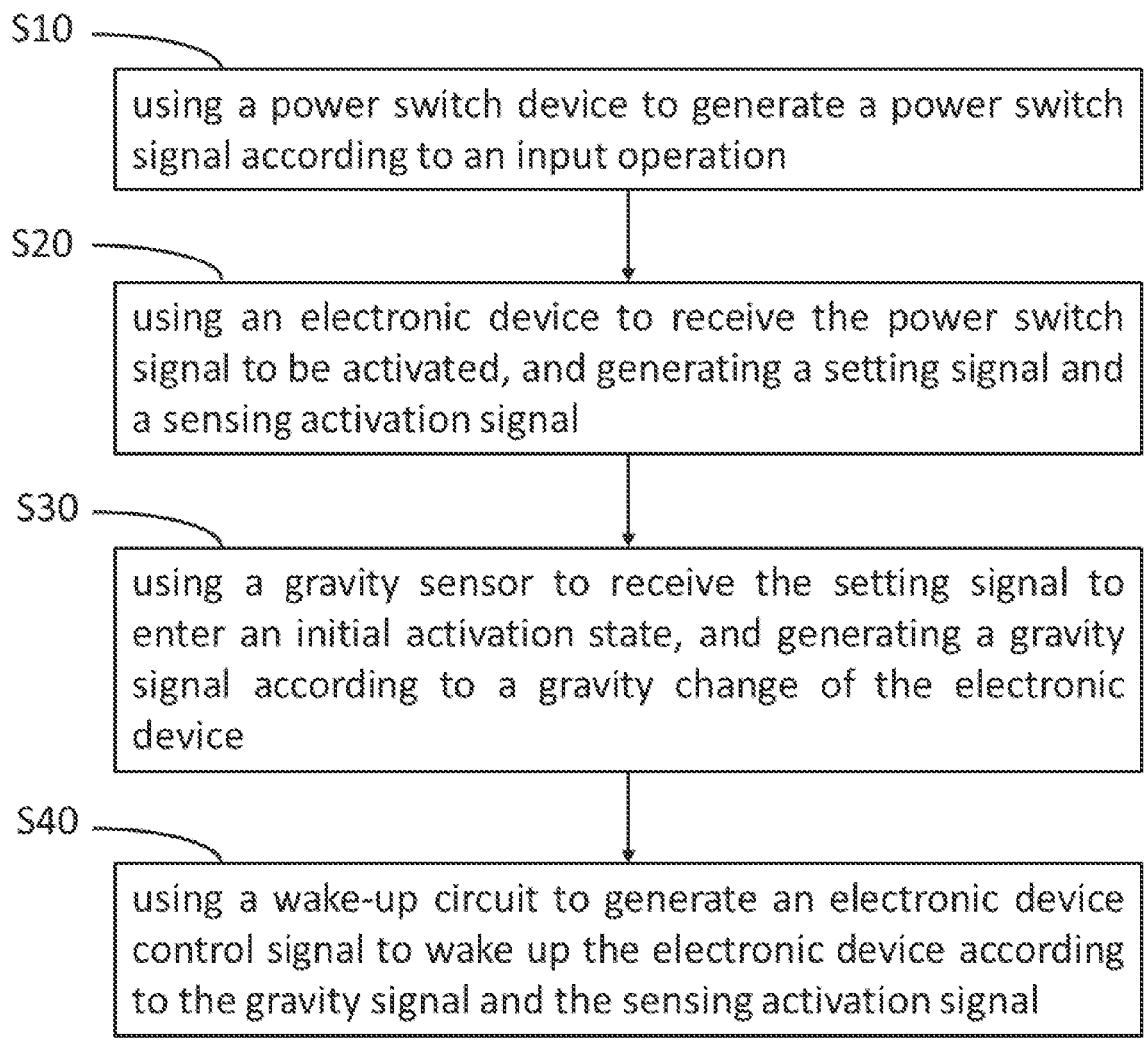
FIG. 5 is a schematic flowchart of an electronic device wake-up method provided by the present application.

Please further refer to FIG. 5, FIG. 5 is a schematic flowchart of an electronic device wake-up method provided by the present application, wherein the electronic device wake-up method provided by the present application includes:

S10: using a power switch device to generate a power switch signal according to an input operation.

S20: using an electronic device to receive the power switch signal to be activated, and generating a setting signal and a sensing activation signal.

S30: using a gravity sensor to receive the setting signal to enter an initial activation state, and generating a gravity signal according to a gravity change of the electronic device.

S40: using a wake-up circuit to generate an electronic device control signal to wake up the electronic device according to the gravity signal and the sensing activation signal.

Figure 6:
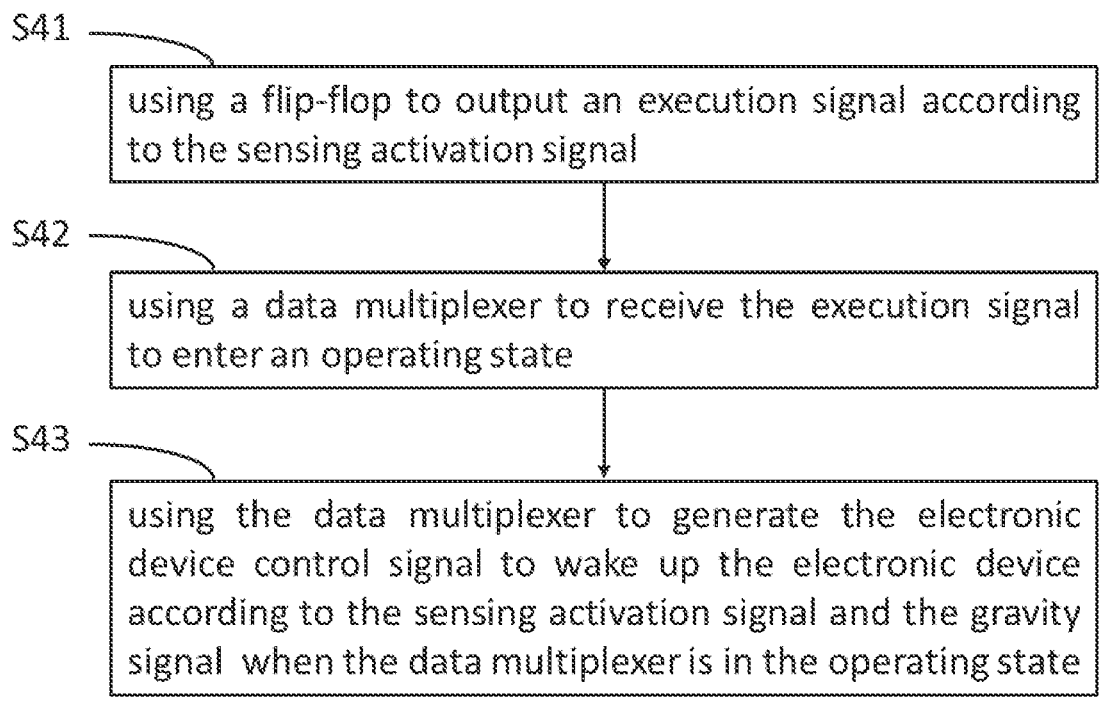
FIG. 6 is a schematic flowchart of the electronic device wake-up method provided by the present application.

Further, please refer to FIG. 6, in one embodiment of the present application, the process S40 of using the wake-up circuit to generate the electronic device control signal to wake up the electronic device according to the gravity signal and the sensing activation signal can be designed to include:

S41: using a flip-flop to output an execution signal according to the sensing activation signal.

S42: using a data multiplexer to receive the execution signal to enter an operating state.

S43: using the data multiplexer to generate the electronic device control signal to wake up the electronic device according to the sensing activation signal and the gravity signal when the data multiplexer is in the operating state.

The present application has the following beneficial effects: The various embodiments of the present application can make gravity sensors with different activation conditions compatible with electronic devices, avoiding limited selection of materials of the gravity sensors suitable for electronic wake-up devices. In addition, a power supply high electrical potential of the electronic device and a power supply high electrical potential connected to the first input terminal of the flip-flop are designed to be equipotential, so as to ensure a stability of the driving current flowing through the electronic wake-up device and improve an amplitude of a current driving the electronic wake-up device. Furthermore, by the design that the data multiplexer and the electronic device share the ground potential, the safety of the electronic wake-up device under heavy load is ensured and the electronic wake-up device is prevented from being damaged.

Moreover, the present application uses a circuit design for coupling the power switch device and the electronic device, so that the user can simultaneously choose to switch the electronic wake-up device and the electronic device through the gravity change and the input operation of the power switch device. Moreover, the gravity sensor can be connected to the electronic device through an inter-integrated circuit (I2C) bus with a simple structure and a small occupation space, thereby reducing a space occupied by the circuit and the number of transistors between the gravity sensor and the electronic device. In addition, the gravity sensor can also be connected to the electronic device through a serial peripheral interface (SPI) bus with high data transmission rate, so as to improve a response speed of the gravity sensor to the setting signal, and to accurately sense a gravity change of the electronic device to improve an operational efficiency.

It should be noted that the combination of each element in the present application preferably forms the above multiple embodiments, but this should not be interpreted as a limitation of the present application. That is, each element in the present application can also have more combinations, not limited to the above multiple embodiments.

In this paper, specific examples are used to illustrate the principles and implementation methods of the present application, and the descriptions of the above embodiments are only used to help understand the technical solutions and core ideas of the present application. Those of ordinary skill in the art should understand that: they can still modify the technical solutions recorded in the preceding embodiments, or to make equivalent substitutions for some of the technical features thereof. These modifications or replacements do not allow an essence of the corresponding technical solution depart from a scope of the technical scheme of each embodiment of the present application.

What is claimed is:

1. An electronic wake-up device, comprising:
a power switch device configured to generate a power switch signal according to an input operation;
an electronic device coupled to the power switch device, wherein the electronic device is configured to receive the power switch signal to be activated and generate a setting signal and a sensing activation signal;
a gravity sensor coupled to the electronic device, wherein the gravity sensor is configured to receive the setting signal to enter an initial activation state, and wherein the gravity sensor generates a gravity signal according to a gravity change of the electronic device; and
a wake-up circuit coupled to the electronic device and the gravity sensor, wherein the wake-up circuit is configured to receive the sensing activation signal and generate an execution signal according to the sensing activation signal, and generate an electronic device control signal according to the execution signal and the gravity signal to wake up the electronic device.

2. The electronic wake-up device according to claim 1, wherein the wake-up circuit comprises:
a flip-flop, wherein a first input terminal of the flip-flop is connected to a power supply high electrical potential, wherein a second input terminal of the flip-flop is connected to the electronic device, and wherein the flip-flop is configured to output the execution signal according to the sensing activation signal; and
a data multiplexer coupled to the flip-flop, wherein the data multiplexer is configured to receive the execution signal to enter an operating state, wherein a first input terminal of the data multiplexer is connected to a ground electrical potential, wherein a second input terminal of the data multiplexer is coupled to the gravity sensor, and wherein the data multiplexer generates the electronic device control signal according to the gravity signal to wake up the electronic device when the data multiplexer is in the operating state.

3. The electronic wake-up device according to claim 2, wherein a power supply high electrical potential of the electronic device has a same electrical potential as the power supply high electrical potential connected to the first input terminal of the flip-flop.

4. The electronic wake-up device according to claim 1, wherein the power switch device is coupled to the electronic device, wherein the power switch signal comprises a power on signal and a power off signal, and wherein the sensing activation signal is at a low electrical potential when the electronic device receives the power off signal.

5. The electronic wake-up device according to claim 1, wherein the gravity signal is at a low electrical potential when the gravity sensor is in the initial activation state.

6. The electronic wake-up device according to claim 1, wherein the wake-up circuit wakes up the electronic device when the electronic device control signal is at a low electrical potential.

7. The electronic wake-up device according to claim 1, wherein the gravity sensor is connected to the electronic device through an interface module, and wherein the interface module comprises an integrated circuit bus.

8. The electronic wake-up device according to claim 1, wherein the gravity sensor is connected to the electronic device through an interface module, and wherein the interface module comprises a serial peripheral interface.

9. A method of waking up electronic device, comprising:
using a power switch device to generate a power switch signal according to an input operation;
using an electronic device to receive the power switch signal to be activated, and generating a setting signal and a sensing activation signal;
using a gravity sensor to receive the setting signal to enter an initial activation state, and generating a gravity signal according to a gravity change of the electronic device; and
using a wake-up circuit to generate an electronic device control signal to wake up the electronic device according to the gravity signal and the sensing activation signal, comprising:
using a flip-flop to output an execution signal according to the sensing activation signal;
using a data multiplexer to receive the execution signal to enter an operating state; and
using the data multiplexer to generate the electronic device control signal to wake up the electronic device according to the gravity signal when the data multiplexer is in the operating state.

10. The method of waking up electronic device as described in claim 9, wherein the power switch device is coupled to the electronic device, wherein the power switch signal comprises a power on signal and a power off signal, and wherein the sensing activation signal is at a low electrical potential when the electronic device receives the power off signal.

* * * * *